July 19, 1938.  W. B. RAYTON  2,124,356
PHOTOGRAPHIC OBJECTIVE
Filed Feb. 8, 1937
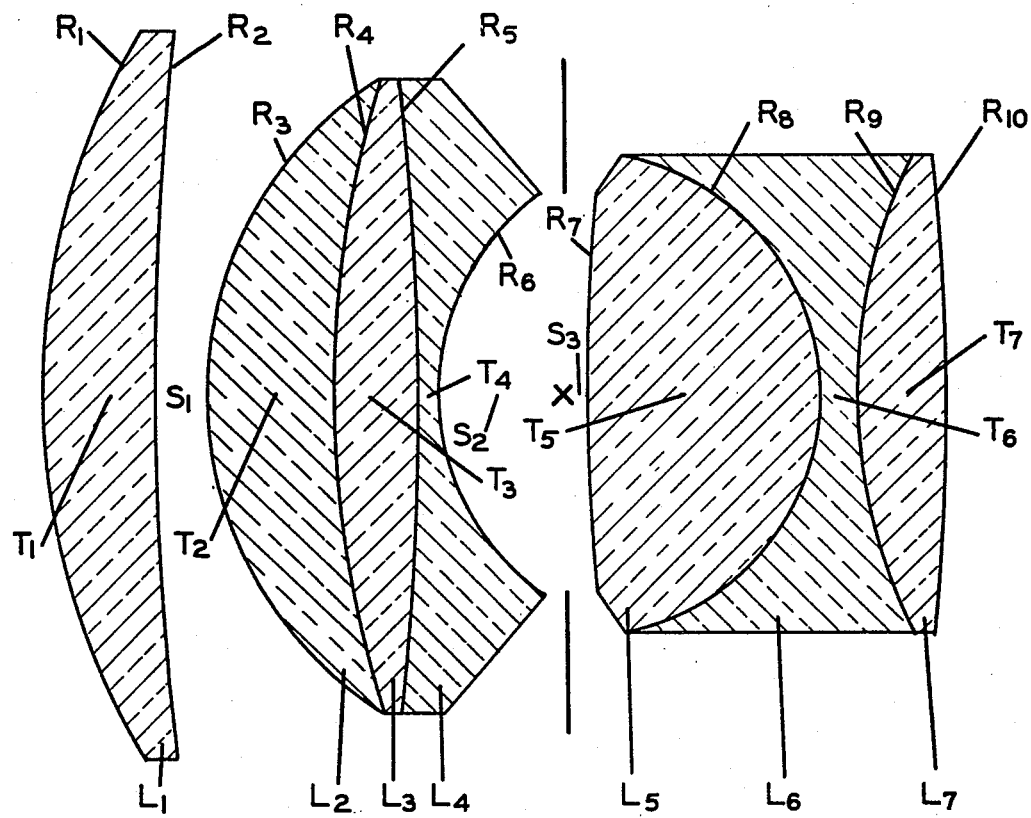
F 1.5   FOCAL LENGTH = 100MM
| | | | | |
|---|---|---|---|---|
| $L_1$ | $D = 1.6369$ $v = 56.0$ | $R_1 = 67.20$ $R_2 = 309.2$ | $S_1 = 0.52$ | $T_1 = 10.8$ |
| $L_2$ | $D = 1.6707$ $v = 47.4$ | $R_3 = 38.36$ $R_4 = 107.22$ | | $T_2 = 12.1$ |
| $L_3$ | $D = 1.4644$ $v = 66.0$ | $R_5 = 269.2$ | | $T_3 = 7.8$ |
| $L_4$ | $D = 1.6890$ $v = 30.9$ | $R_6 = 23.68$ | $S_2 = 12.32$ | $T_4 = 2.0$ |
| $L_5$ | $D = 1.6574$ $v = 50.8$ | $R_7 = 207.0$ | $S_3 = 4.08$ | $T_5 = 22.7$ |
| $L_6$ | $D = 1.54832$ $v = 53.3$ | $R_8 = 23.4$ | | $T_6 = 3.6$ |
| $L_7$ | $D = 1.6574$ $v = 50.8$ | $R_9 = 57.0$ $R_{10} = 224.2$ | | $T_7 = 8.0$ |
WILBUR B. RAYTON
INVENTOR.
BY
ATTORNEYS Patented July 19, 1938

2,124,356

UNITED STATES PATENT OFFICE 2,124,356

PHOTOGRAPHIC OBJECTIVE

Wilbur B. Rayton, Rochester, N. Y., assignor to Bausch & Lomb Optical Company, Rochester, N. Y., a corporation of New York Application February 8, 1937, Serial No. 124,599

4 Claims. (Cl. 88—57)

The present invention relates to objectives and more particularly to high speed photographic and projection objectives.

One of the objects of the present invention is to provide a high speed photographic objective having a wide picture angle and being well corrected for aberrations, astigmatism, coma and distortion. Another object is to provide a high speed objective having a positive front element, a negative intermediate element, and a positive rear triplet composed of a negative element cemented between two positive elements. These and other objects and advantages reside in certain novel features of construction, arrangement and combination of parts as will hereinafter be more fully set forth and pointed out in the appended claims.

The drawing shows a section taken along the axis of a lens embodying this invention.

According to the present invention, the objective is composed of a positive front element $L_1$, a negative, meniscus shaped triplet $L_2L_3L_4$ and a biconvex rear triplet $L_5L_6L_7$. The central triplet consists of a positive, meniscus element $L_2$, a biconvex lens $L_3$ and a biconcave element $L_4$ cemented together. The rear triplet consists of a biconcave element $L_6$ cemented between two biconvex elements $L_5$ and $L_7$. The two elements $L_5$ and $L_7$ are of unequal power, the stronger, $L_5$, being adjacent the diaphragm indicated at X and the cemented surface between $L_5$ and $L_6$ is very highly curved and concave toward the diaphragm.

The numerical data for the improved construction shown in the drawing are as follows:

1:15    f=100    field=42°

$L_1 \begin{cases} D= 1.6369 \\ \nu=56.0 \end{cases}$  $\begin{matrix} R_1= 67.20 \\ R_2=309.2 \end{matrix}$ --------$T_1$=10.8

$S_1$=0.52

$L_2 \begin{cases} D= 1.6707 \\ \nu=47.4 \end{cases}$  $\begin{matrix} R_3= 38.36 \\ R_4=107.22 \end{matrix}$ --------$T_2$=12.1

$L_3 \begin{cases} D= 1.4644 \\ \nu=66.0 \end{cases}$  $R_5=269.2$ --------$T_3$= 7.8

$L_4 \begin{cases} D= 1.6890 \\ \nu=30.9 \end{cases}$  $R_6= 23.68$ --------$T_4$= 2.0

$S_2$=12.32
$S_3$= 4.08

$L_5 \begin{cases} D= 1.6574 \\ \nu=50.8 \end{cases}$  $\begin{matrix} R_7=207.0 \\ R_8= 23.4 \end{matrix}$ --------$T_5$=22.7

$L_6 \begin{cases} D= 1.54832 \\ \nu=53.3 \end{cases}$  $R_9= 57.0$ --------$T_6$= 3.6

$L_7 \begin{cases} D= 1.6574 \\ \nu=50.8 \end{cases}$  $R_{10}=224.2$ --------$T_7$= 8.0

In this example, $S_2$ and $S_3$ indicate, respectively, the spacing between $L_4$ and the diaphragm indicated at X and the spacing between the diaphragm and $L_5$.

By means of the foregoing construction, I am able to attain the objects of my invention and provide a high speed, wide angle photographic objective which is well corrected for aberrations, coma and distortion. Various modifications can, of course, be made without departing from the spirit of my invention or the scope of the appended claims.

I claim:

1. A rapid objective comprising seven lenses arranged in axial alignment in three groups separated from each other by two air spaces, the first group consisting of a single collective front element of highly refractive glass, the second group consisting of three elements cemented together to form a meniscus member of negative power with its positive surface facing the first group, the third group consisting of a biconcave lens cemented between two biconvex lenses, the cemented surface nearer said second group being highly concave toward said second group.

2. A rapid objective comprising seven lenses arranged in axial alignment in three groups separated from each other by two air spaces, the first group consisting of a single collective front element of highly refractive glass, the second group consisting of three elements cemented together to form a meniscus member of negative power with its positive surface facing the first group, the third group consisting of a negative element cemented between two positive elements, the positive element adjacent the second group having an axial thickness approximately two thirds that of the third group.

3. A rapid objective comprising seven lenses arranged in axial alignment in three groups separated from each other by two air spaces, the first group consisting of a single collective front element of highly refractive glass, the second group consisting of three elements cemented together to form a meniscus member of negative power with its positive surface facing the first group, the third group consisting of a biconcave lens of low refractive index cemented between two biconvex lenses of higher refractive index, one of said cemented surfaces being highly curved and concave toward the second group, the other cemented surface being less highly curved and convex toward said intermediate member.

4. A rapid objective comprising seven lenses arranged in axial alignment in three groups separated from each other by two air spaces, the first group consisting of a single collective front element of highly refractive glass, the second group consisting of three elements cemented together to form a meniscus member of negative power with its positive surface facing the first group, the third group being of positive power and consisting of a biconcave lens of relatively low refractive index cemented between two biconvex lenses of higher refractive index.

WILBUR B. RAYTON.